US012792474B2

(12) United States Patent
Naik et al.

(10) Patent No.: US 12,792,474 B2
(45) Date of Patent: Nov. 10, 2026

(54) MINIMIZING CLUSTER FREEZE SNAPSHOT IN SCALE OUT SOLUTION

(71) Applicant: Dell Products L.P., Round Rock, TX (US)

(72) Inventors: Neha R. Naik, Fairview, PA (US); Murthy V. Mamidi, Queen Creek, AZ (US); Viral Kirtikumar Mehta, JamKhambhalia (IN); Bhagyashri Ashok Pathak, Maharashtra (IN)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 19/083,630

(22) Filed: Mar. 19, 2025

(65) Prior Publication Data

US 2026/0288603 A1 Sep. 24, 2026

(51) Int. Cl.

| | |
|---|---|
| ***G06F 11/00*** | (2006.01) |
| ***G06F 11/1446*** | (2026.01) |

(52) U.S. Cl.

CPC ...... *G06F 11/1466* (2013.01); *G06F 11/1451* (2013.01); *G06F 11/1464* (2013.01)

(58) Field of Classification Search

CPC ............. G06F 11/1466; G06F 11/1451; G06F 11/1464; G06F 11/3006; G06F 11/301; G06F 11/0712; G06F 11/1604; G06F 11/1679; G06F 11/0709

See application file for complete search history.

(56) References Cited

U.S. PATENT DOCUMENTS

| | | | | |
|---|---|---|---|---|
| 6,173,293 | B1 * | 1/2001 | Thekkath | G06F 16/10 |
| 12,222,903 | B1 * | 2/2025 | Rothschilds | G06F 16/172 |

* cited by examiner

*Primary Examiner* — Katherine Lin

(74) *Attorney, Agent, or Firm* — Chamberlain, Hrdlicka, White, Williams & Aughtry; Aly Z. Dossa

(57) ABSTRACT

A method for creating a snapshot includes receiving, at a first node, a request for a snapshot of a partition. The method further includes requesting an exclusive lock mode in the first node with a distributed lock manager (DLM) server. Moreover, the method includes making a first determination identifying which nodes in a distributed system are on the partition and in a shared lock mode using the DLM server. Further, the method includes sending a revoke request to the identified nodes based on the first determination. The method further includes flushing dirty data on the identified nodes to a remote storage system. After flushing the dirty data, the method includes revoking the shared lock mode from the identified nodes. In addition, the method includes granting the exclusive lock mode to the first node. Finally, the method includes creating, by the first node, the snapshot of the partition.

20 Claims, 6 Drawing Sheets

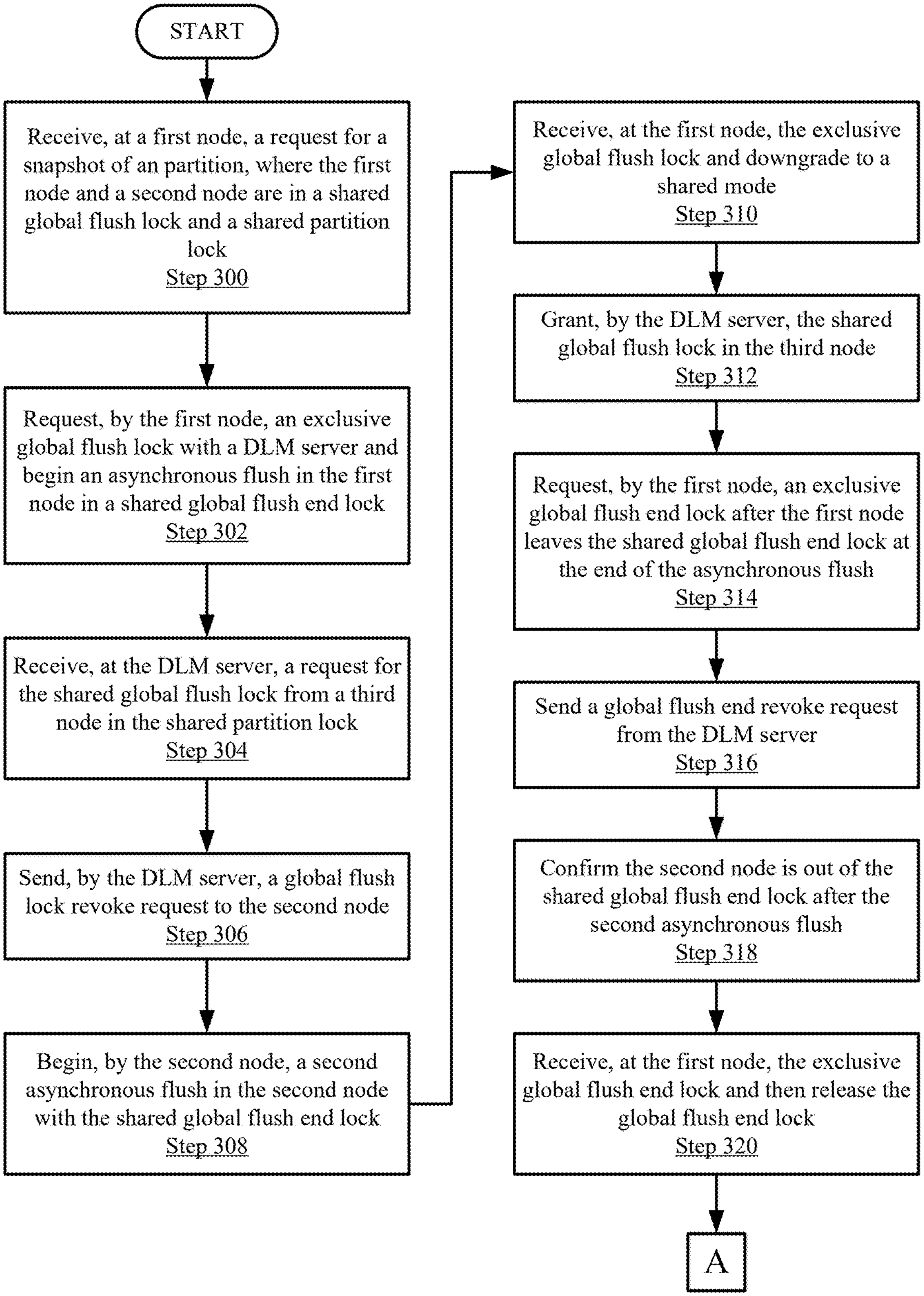
FIG. 3.1

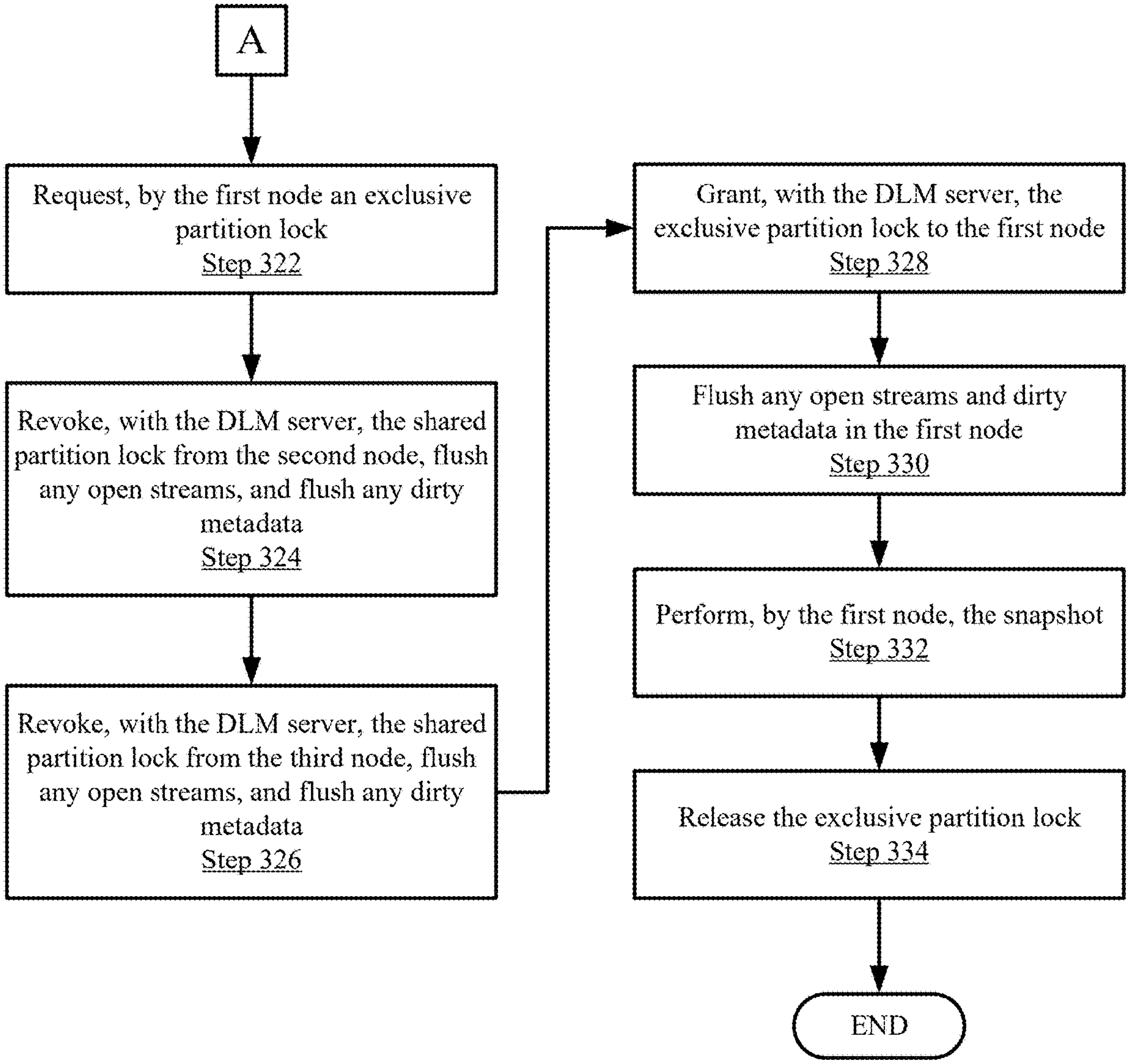
*FIG. 3.2*

MINIMIZING CLUSTER FREEZE SNAPSHOT IN SCALE OUT SOLUTION

BACKGROUND

In file systems, a snapshot is a basic construct to preserve a point in time copy of the file system. The snapshot may have many use cases such as replication, garbage collecting, verification, etc. With many use cases, snapshots are frequently used particularly in globally distributed file systems. The amount of time to complete a snapshot is important because a given file system may be modified on some or all nodes and in order to perform a snapshot, all data with changes not reflected in storage (i.e., dirty data) must be flushed synchronously in each node of the file system. This causes a cluster freeze (e.g., the nodes must be locked to flush dirty data). More nodes, more spread of the file system, and more dirty data, each increase the interval of the snapshot.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 3.1 shows a flowchart for a method for creating a snapshot in accordance one or more embodiments disclosed herein.

FIG. 3.2 shows a flowchart for a method for creating a snapshot in accordance one or more embodiments disclosed herein.

DETAILED DESCRIPTION

Figure 1:
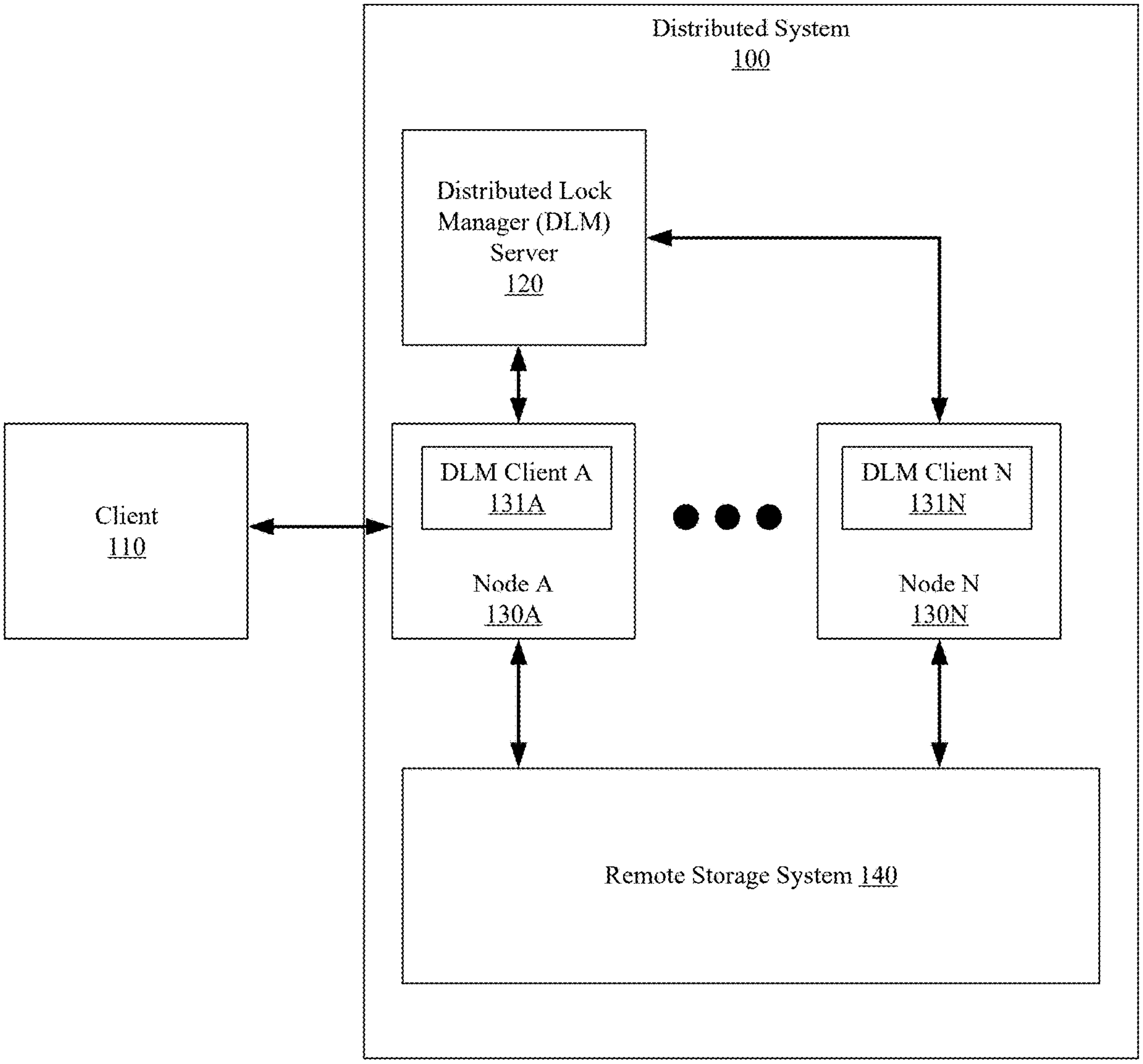
FIG. 1 shows a distributed system in accordance with one or more embodiments.

In a traditional distributed system, when snapshots are taken of a partition of the distributed system, the file system is quiesce (i.e., paused to achieve a consistent state) and any data not saved to a disk or storage (e.g., dirty data) must be saved to the disk to be included in the snapshot. When the system is distributed, files in the partition can be accessed across multiple nodes, meaning the whole partition needs to be quiesced and all dirty data needs to be written to the disk (e.g., flushed) prior to performing the snapshot. Therefore, the nodes accessing the partition need to be identified, quiesced, and have all dirty data flushed before making the copy to ensure data consistency and integrity. Problems with the traditional methods of quiescing the partition include the need for all dirty data to be flushed synchronously leading to a cluster freeze. The more nodes a system has the longer the duration of the cluster freeze. Three problems arise from performing the snapshot in the traditional distributed system: (i) identifying the nodes accessing the partition, quiesce and flush data before taking a copy, to ensure data consistency and integrity, (ii) communicating operation intent and meta info such as snapshot identification to the nodes in the system, and (iii) implementing node failure handling mechanisms, such as retries and timeouts, to maintain data consistency and system operability in the event of node failures. In most traditional distributed systems, the node which is trying to take the snapshot will communicate with all related nodes and let the related nodes determine if there are any modified files belonging to the partition being flushed. This is disadvantageous because every node should be available to respond to snapshot operation even though many nodes may never have accessed the partition of the file system, and this does not scale with large number of nodes in the system. In other traditional distributed file systems with large number of nodes, the file systems may limit access to portions of file system to only a few nodes statically, imposing great limitations on accessing data in the file system. For at least the reasons discussed above, a different approach for creating snapshots may be beneficial.

Embodiments disclosed herein relate to a method of using a distributed lock manger (DLM) server to perform a snapshot. The method includes starting an opportunistic flush, determining what nodes require flushing by leveraging the DLM server which stores metadata on the nodes. This reduces the duration of the snapshot by reducing the searching of the nodes. In one or more embodiments, the DLM server has access to a list of nodes which have files in use (e.g., contain data that is not reflected in a remote storage system for the partition at a given time. These files in use (e.g., dirty data) can be flushed strategically on the nodes with the dirty data (e.g., the opportunistic flush). The DLM server has access to this information via the protection of nodes tasks (e.g., shared lock mode) in the partition. In response to a request for a snapshot of the partition, the dirty data will be flushed and the partition quiesced. Then, a snapshot may be created.

In one or more embodiments, the DLM server may use DLM Application Programming Interfaces (APIs) to embed additional information in the grant and revoke requests including information from the first node such as whether only the data needs to be flushed, only the metadata needs to be flushed or both. This information may be used by the second node and third node to reduce the amount of data flushed to the remote storage system. Also, the additional information may include requests for statistics such as the number of files already synchronized to the remote storage system prior to revoking the shared lock mode. This information may be used by the first node performing the snapshot to increase the efficiency of producing the snapshot.

In one or more embodiments, a two-phase opportunistic flush may be used to further reduce the cluster freeze compared to the opportunistic flush. The two-phase opportunistic flush includes proactive flushing of dirty metadata using the DLM server to target nodes with may have modified metadata for the partition. The two-phase opportunistic flush utilizes a parallel flush (e.g., pair of global flush locks) independent of the shared lock mode to minimize the cluster freeze. The global flush locks are only used when a node is performing operations that modify the partition itself and would therefore have dirty metadata for the partition. The dirty data is flushed as described above with the opportunistic flush. The exclusive lock mode will be used to create the snapshot after all dirty data and dirty metadata has been flushed.

The following describes various embodiments disclosed herein.

Turning to FIG. 1, FIG. 1 shows a distributed system (100) connected to a client (110). The distributed system (100) includes a DLM server (120), a plurality of nodes (130A, 130N), and a remote storage system (140). The distributed system (100) includes at least one partition. In one or more embodiments, multiple partition may exist in the distributed system with one partition being accessed by multiple nodes and another partition being accessed by multiple other nodes.

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. Those skilled in the art will appreciate that any other type of network (or network topology) may be used without departing from the disclosure.

In one or more embodiments, the DLM server (120) contains functionality to initiate different distributed system wide locks. The DLM server (120) may provide lock delegation to nodes in the distributed system (100) and may revoke the lock delegation. The DLM server (120) communicates with DLM clients on the plurality of nodes (130A, 130N) to provide and revoke lock delegations. The DLM server (120) and all the DLM clients are part of a distributed lock manager which executes on each machine in the distributed system including the plurality of nodes (130A, 130N). The distributed lock manager controls access to shared resources in the distributed system (100). The distributed lock manager further includes the DLM lock which allows for a lock on all parts of the distributed system (100), functionality for a grant callback (e.g., granting a delegation to a node), and functionality for a revoke callback (e.g., revoking a delegation from a node). The distributed lock manager has access to each node in the distributed system via the DLM server (120) and the plurality of DLM clients present in the plurality of nodes (130A, 130N). The distributed lock manager always has indirect information on each of the nodes due to the locking methods used for the nodes being provided by the distributed lock manager. The distributed lock manager, via the DLM server (120), handles all locking requests for the plurality of nodes (130A, 130N) of the distributed system (100).

Figure 5:
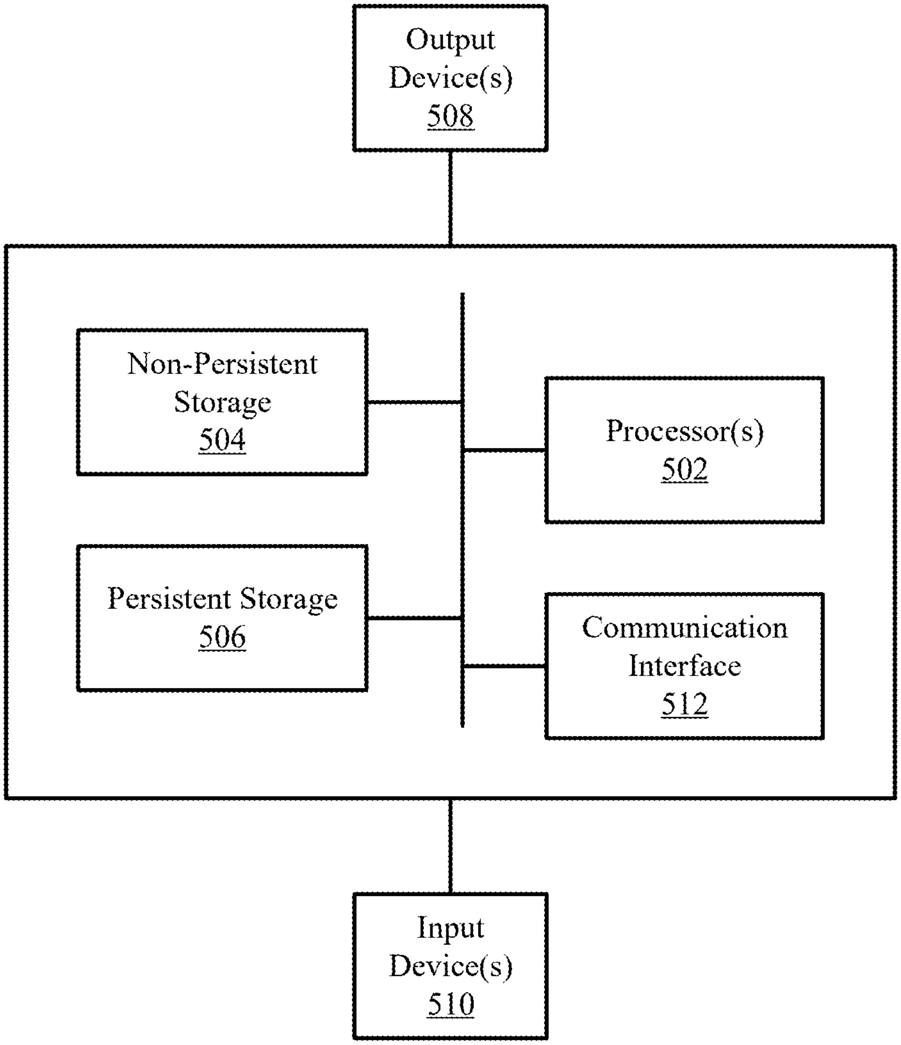
FIG. 5 shows a diagram of a computing device in accordance with one or more embodiments disclosed herein.

In one or more embodiments, the DLM server (120) may be implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the DLM server (120) described throughout this application and/or all, or a portion thereof, of the methods illustrated in FIGS. 2-3.2.

In one or more embodiments, the DLM server (120) is implemented as a logical device(s). Each logical device may utilize the computing resources of any number of computing devices and thereby provide the functionality of the DLM server (120) described throughout this application and/or all, or a portion thereof, of the methods illustrated in FIGS. 2-3.2.

The plurality of nodes (130A, 130N) may include a node A (130A), a node N (130N), and any other number of nodes. Each node contains a DLM client (131A, 131N). For example, as shown in FIG. 1., Node A (130A) includes a DLM client A (131A), and node N (130N) includes a DLM client N (131N). The plurality of nodes (130A, 130N) will be described using node A (130A). Node A (130A) includes the DLM client A (131A). The DLM client A (131A) is in communication with the DLM server (120). Node A (130A) is operatively connected to the DLM server (120) and the remote storage system (140). Node A (130A) includes functionality to perform read and write operations on data from the remote storage system (140). Node A (130A) may also write new data to the remote storage system (140). Node A (130A) further includes functionality to perform the methods described in FIGS. 2-3.2.

The plurality of nodes (130A, 130N) may be associated with one or more partitions. For example, Node A (130A) along with two other nodes (e.g., a second node and a third node) is associated with a first partition, while Node N (130N) and two other nodes (e.g., a fourth node and a fifth node) (not shown) are associated with a second partition.

In one or more embodiments, each of the plurality of nodes (130A, 130N) may be implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the plurality of nodes (130A, 130N) described throughout this application and/or all, or a portion thereof, of the methods illustrated in FIGS. 2-3.2.

In one or more embodiments, each of the plurality of nodes (130A, 130N) is implemented as a logical device(s). Each logical device may utilize the computing resources of any number of computing devices and thereby provide the functionality of the plurality of nodes (130A, 130N) described throughout this application and/or all, or a portion thereof, of the methods illustrated in FIGS. 2-3.2.

Figure 2:
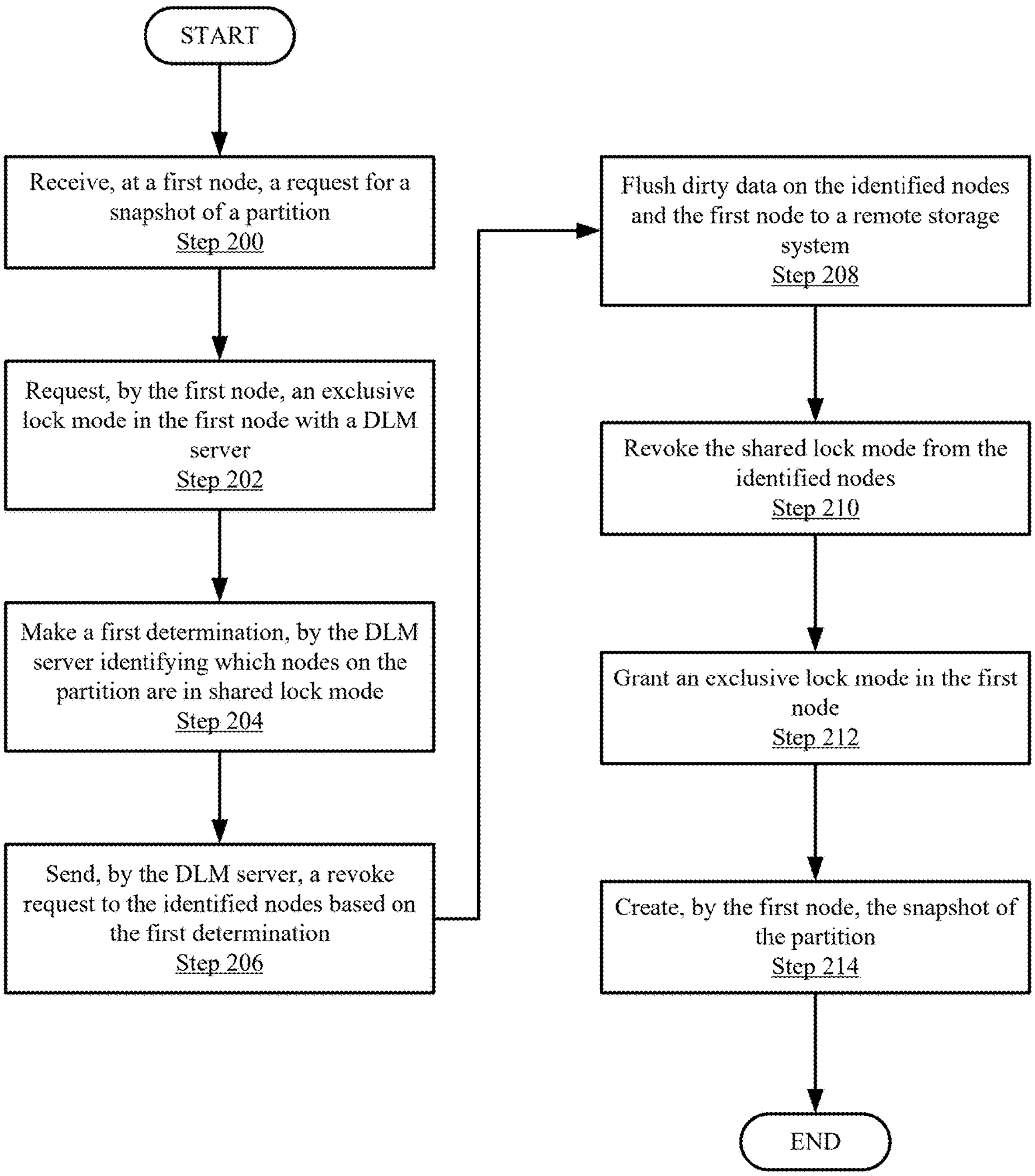
FIG. 2 shows a flowchart for a method for creating a snapshot in accordance one or more embodiments disclosed herein.

In one or more embodiments of the invention, the remote storage system (140) includes functionality to perform the methods described in FIGS. 2-3.2. In one or more embodiments, the remote storage system (140) may be implemented as a file store. When implemented as a file store, the remote storage system (140) stores data as files. The files may be organized within a hierarchy using, for example, directories and/or folders. In one or more embodiments, the remote storage system (140) may be implemented as an object store. When implemented as an object store, the data is stored as discrete units called objects (instead of files). Each object includes the data itself, metadata that describes the data, and a unique identifier, allowing for efficient retrieval and organization.

The remote storage system (140) may be implemented as a computing device. The computing device may be, for example, a server, a distributed computing system, or a cloud resource. The computing device may include one or more processors, memory (e.g., random access memory), and persistent storage (e.g., disk drives, solid state drives, etc.). The remote storage system (140) may utilize, to store data, volatile storage, non-volatile storage, or any combination thereof to store the aforementioned data. Examples of storage include (but are not limited to): a hard disk drive (HDD), a solid-state drive (SSD), random access memory (RAM), flash memory, a tape drive, a fibre-channel (FC) based storage device, a non-volatile memory express (NVMe) device, a NVMe over Fabrics (NVMe-oF) device, resistive RAM (ReRAM), and persistent memory (PMEM).

In one or more embodiments, the remote storage system (140) is implemented as a logical device(s). Each logical device may utilize the computing resources of any number of computing devices and thereby provide the functionality of the remote storage system (140) described throughout this application and/or all, or a portion thereof, of the methods illustrated in FIGS. 2-3.2.

The client (110) is an interface (e.g., device) for a user of the distributed system to view and modify data stored on the partition. The client (110) interacts with the data of the partitions stored on the remote storage system (140) via the plurality of nodes (130A, 130N). The client (110) includes functionality to request a snapshot be created of the partition.

In one or more embodiments of the invention, the client (110) may be implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may provide the functionality of the client (110) described throughout this application and/or all, or a portion thereof, of the methods illustrated in FIGS. 2-3.2.

In one or more embodiments, the client (110) is implemented as a logical device(s). Each logical device may utilize the computing resources of any number of computing devices and thereby provide the functionality of the client (110) described throughout this application and/or all, or a portion thereof, of the methods illustrated in FIGS. 2-3.2.

Turning to FIG. 2, FIG. 2 shows a flowchart for a method for creating a snapshot in accordance one or more embodiments disclosed herein. The method of FIG. 2 may be performed by, for example, the DLM server (e.g., 120, FIG. 1) and the plurality of nodes such as Node A (e.g., 130A, FIG. 1). Other components of the system of FIG. 1 may perform all, or a portion, of the method of FIG. 2 without departing from the disclosure.

While the various steps in the flowchart of FIG. 2 are presented and described sequentially, one of ordinary skill in the relevant art will appreciate that some or all of the steps may be executed in different orders, may be combined, or omitted, and some or all steps may be executed in parallel.

In Step 200, a first node receives a request for a snapshot of a partition of the distributed system (e.g., 100, FIG. 1). The first node may be Node A (e.g., 130A, FIG. 1). The first node receives the request from the client (e.g., 110, FIG. 1), which accesses the partition via the first node. The first node is part of the partition and may access and modify the data stored on the remote storage system (e.g., 140, FIG. 1) of the partition.

In Step 202, the first node requests an exclusive lock mode with the DLM server. In response to the request for the snapshot, the first node communicates with the DLM server to request the exclusive lock mode. To perform the snapshot, the first node will be in exclusive lock mode to ensure the partition is quiesced and the dirty data in any other nodes is flushed to the remote storage system. In order to grant the request for the exclusive lock mode, the DLM server must revoke a shared lock mode from all other nodes.

In Step 204, the DLM server makes a first determination identifying which nodes on the partition are in the shared lock mode. All nodes which are actively using files in the partition will have a grant of the shared lock mode. To grant the exclusive lock mode to the first node, the DLM server needs to revoke the shared lock mode from all other nodes on the partition to quiesce the partition. For example, the DLM server may determine that a second node and a third node are in the shared lock node with the first node making the second node and the third node identified nodes. The DLM server indirectly has the information of which nodes have the shared lock mode because of the locking method that grants the shared lock mode is part of the distributed lock manager. In one or more embodiments, the DLM server handles all lock requests and revocations including other locks besides the shared lock mode and exclusive lock mode. Further, the DLM server grants the original shared lock mode to the nodes and can therefore determine which nodes are accessing data on the partition.

In Step 206, the DLM server sends a revoke request to the identified nodes based on the first determination. Each identified node receives the revoke request to initiate flushing of dirty data before revoking the shared lock and quiescing the partition. In one or more embodiments, the revoke request is a revoke callback above with respect to FIG. 1. In one or more embodiments, the revoke request includes code to cause the node to flush the dirty data (i.e., unstabilized data) as described in Step 208. Any other nodes in the distributed system not part of the partition (e.g., not in the shared lock mode) are not sent a revoke request. This reduces the remote procedure calls to these other nodes and also prevents unrelated nodes affecting the performance of the snapshot (e.g., preventing an error returned from unrelated nodes or a delay in response).

In one or more embodiments, if a node crashes with dirty data in response to the revoke request or at another step of the method, a recovery mechanism is built into the DLM server to clean up locks on the nodes. This leads to the snapshot operation continuing even if the dirty data in the crashed node is lost. If the unrelated nodes crash, the snapshot operation is not affected.

In one or more embodiments, the DLM server can use the DLM application programming interfaces to embed additional information in the revoke requests and grant requests discussed in Step 212. This additional information may include some hints on the data which can be utilized by the nodes to determine whether only data needs to be flushed or metadata needs to be flushed or both need to be flushed on a particular node. Additionally, a similar mechanism may be used to collect statistics from the identified nodes such as number of files synchronized before revoking the shared lock from a node. These statistics may be transmitted to the first node to have the information on total number of files synchronized to remote storage system before triggering a snapshot. Such meta-information may be communicated depending on the type of operation being performed.

In Step 208, the identified nodes and the first node flush dirty data to a remote storage system. After receiving the revoke request, the identified nodes determine what dirty data (e.g., data and metadata that has not been saved to the remote storage system) is present on the node. This dirty data is then flushed (e.g., saved to the remote storage system). Flushing the dirty data from the identified nodes and the first node ensures the data of partition is consistent between the nodes and the remote storage system. For example, if prior to the revoke request the first node is modifying a first file, the first node will flush the first file to the remote storage system. If prior to the revoke request the second node is modifying a second file, the second node will flush the second file to the remote storage system. If prior to the revoke request the third node is modifying a third file, the third node will flush the third file to the remote storage system. Because the DLM server only sends the revoke request to the identified nodes which have files 'in use' from the partition, flushing is triggered only on nodes with dirty data (e.g., the first node and the identified nodes).

In Step 210, the DLM server revokes the shared lock mode from the identified nodes. Once the dirty data is flushed, the partition must be quiesced to prevent new dirty data before the snapshot. The DLM server revokes the shared lock mode from the identified nodes allowing the exclusive lock mode to be granted to the first node.

In Step 212, the DLM server grants an exclusive lock mode in the first node. In one or more embodiments, the grant is a grant callback described in FIG. 1. The partition is quiesced and the dirty data has been flushed to the remote storage system. The first node is granted the exclusive lock mode to perform the snapshot.

In Step 214, the first node creates the snapshot of the partition. The snapshot captures a point in time in the partition in the remote storage system that reflects all the changes made by the nodes. The snapshot may be stored in the remote storage system. After Step 214, the method ends.

Turning to FIG. 3.1, FIG. 3.1 shows a flowchart for a method for creating a snapshot in accordance one or more embodiments disclosed herein. The method of FIG. 3.1 may be performed by, for example, the DLM server (e.g., 120, FIG. 1) and the plurality of nodes such as Node A (e.g., 130A, FIG. 1). Other components of the system of FIG. 1 may perform all, or a portion, of the method of FIG. 3.1 without departing from the disclosure.

While the various steps in the flowchart of FIGS. 3.1-3.2 are presented and described sequentially, one of ordinary skill in the relevant art will appreciate that some or all of the steps may be executed in different orders, may be combined, or omitted, and some or all steps may be executed in parallel.

In Step 300, a first node receives a request for a snapshot of a partition on a distributed system (e.g., 100, FIG. 1). The first node and a second node may start in a shared global flush lock and a shared partition lock. In order to access files in the partition a node must have the shared partition lock. In order to modify any file (e.g., write) in the partition a node must have the shared global flush lock. In one or more embodiments, the second node may include a plurality of second nodes in the shared global flush lock and the shared partition lock.

In Step 302, the first node requests an exclusive global flush lock with the DLM server. The first node begins an asynchronous flush in the first node in a shared global flush end lock. The asynchronous flush will flush dirty metadata in the first node to the remote storage system (e.g., 140, FIG. 1). The asynchronous flush begins when the first node begins a shared global flush end lock state that begins when the request for the exclusive global flush lock is sent to the DLM server. The shared global flush end lock state ends in the first node when the asynchronous flush is completed. The asynchronous flush minimizes the duration of the cluster freeze because parallel operations on data may be performed during the asynchronous flush.

In Step 304, the DLM server receives a request for the shared global flush lock from a third node in the shared partition lock. In one or more embodiments, the third node is attempting to perform a modification operation on a file in the partition. Because the request for the shared global flush lock is received at the same time or after the request for the exclusive global flush lock from the first node, the request for the shared global flush lock is queued behind the request for the exclusive global flush lock. Essentially, a node is waiting to be able to perform an operation on the partition at this point. In one or more embodiments, the third node may include a plurality of third nodes.

In Step 306, the DLM server sends a global flush lock revoke request to the second node. The global flush lock revoke request is sent to all nodes with the shared global flush lock besides the first node. The DLM server identifies which nodes are active on the partition by looking at the grants of the global flush lock and the shared partition lock similarly to how the DLM server operates in Step 204 of FIG. 2.

In Step 308, the second node begins a second asynchronous flush in the second node with the shared global flush end lock. In response to the global flush lock revoke request, the second node will enter the global flush end lock and start the second asynchronous flush. The second asynchronous flush will flush dirty metadata in the second node to the remote storage system. The shared global flush end lock state ends in the second node when the second asynchronous flush is completed. The second asynchronous flush minimizes the duration of the cluster freeze because parallel operations on data may be performed during the second asynchronous flush.

In Step 310, the first node receives the exclusive global flush lock and downgrades to a shared mode. The first node downgrades the exclusive global flush lock to allow the second asynchronous flush to be completed and allow the third node to make modifications to files on the partition. Therefore, a node can be flushing all the dirty metadata and data associated with the partition at the same time as new incoming writes can be performed by another node for the entire duration of the flush reducing cluster freeze.

In Step 312, the DLM server grants the shared global flush lock in the third node. The shared global flush lock can be granted to the third node due to the downgrade of the exclusive flush lock in the first node. The third node may then make modifications to files in the partition.

In Step 314, the first node requests an exclusive global flush end lock after the first node leaves the shared global flush end lock at the end of the asynchronous flush. At the end of the asynchronous flush all dirty metadata in the first node is flushed to the remote storage system. With the asynchronous flush complete, the first node does not need the shared global flush lock and requests the exclusive global flush end lock to revoke the shared global flush lock from all nodes which were doing asynchronous flush (e.g., the second node performing the second asynchronous flush).

In Step 316, the DLM server sends a global flush end revoke request. The global flush end request is sent to the second node. The global flush end revoke request acts as a query to determine if all asynchronous flushes have been completed on the nodes in the partition.

In Step 318, the DLM server confirms the second node is out of the shared global flush end lock after the second asynchronous flush. The DLM server determines the second node is out of the shared global flush end lock when the second asynchronous flush is completed revoking the shared global flush end lock from the second node. The revoking of the shared global flush end lock serves as a mechanism to sequence the asynchronous flushes before the first node is granted exclusive locks to perform the snapshot without the need of a remote procedure call or unnecessary delay.

In Step 320, the first node receives the exclusive global flush end lock. The first node can determine that all asynchronous flushes are completed. Once the first node has the exclusive global flush end lock, the purpose of the lock has been served and the first node releases the exclusive global flush end lock which unlocks the exclusive global flush end lock. After Step 320, the method continues in FIG. 3.2.

Turning to FIG. 3.2, FIG. 3.2 shows a flowchart for a method for creating a snapshot in accordance one or more embodiments disclosed herein. The method of FIG. 3.2 may be performed by, for example, the DLM server (e.g., 120, FIG. 1) and the plurality of nodes such as Node A (e.g., 130A, FIG. 1). Other components of the system of FIG. 1 may perform all, or a portion, of the method of FIG. 3.2 without departing from the disclosure.

In Step 322, the first node requests an exclusive partition lock from the DLM server. The requesting results in revocations to all nodes holding the shared partition lock as shown in Steps 324 and 326. Any other nodes in the distributed system not part of the partition (e.g., not in the shared lock mode) are not sent a revoke request. This reduces the remote procedure calls to these other nodes and also prevents unrelated nodes affecting the performance of the snapshot (e.g., preventing an error returned from unrelated nodes or a delay in response).

In Step 324, the DLM server revokes the shared partition lock from the second node. Prior to the revoking, the second node flushes any open streams (e.g., dirty data) and flushes any dirty metadata. The DLM server sends a revoke request for the shared partition lock to the second node. In one or more embodiments, the revoke request includes code to cause the node to flush the dirty data as shown in FIG. 2. After receiving the revoke request, the second node determines what dirty data and dirty metadata (e.g., dirty data and metadata created after the end of second asynchronous flush in the second node) is present on the second node. This dirty data and dirty metadata are then flushed (e.g., saved to the remote storage system). Flushing the dirty data from the second node ensures the data of partition is consistent between the second node and the remote storage system.

In Step 326, the DLM server revokes the shared partition lock from the third node. Prior to the revoking, the third node flushes any open streams (e.g., dirty data) and flushes any dirty metadata. The DLM server sends a revoke request for the shared partition lock to the third node. In one or more embodiments, the revoke request includes code to cause the third node to flush the dirty data as shown in FIG. 2. After receiving the revoke request, the third node determines what dirty data and dirty metadata (e.g., dirty data and metadata created after the grant of the shared global flush lock to the third node) is present on the third node. This dirty data and dirty metadata are then flushed (e.g., saved to the remote storage system). Flushing the dirty data from the third node ensures the data of partition is consistent between the third node and the remote storage system.

In one or more embodiments, if a node crashes with dirty data in response to the revoke request or at another step of the method, a recovery mechanism is built into the DLM server to clean up locks on the nodes. This leads to the snapshot operation continuing even if the dirty data in the crashed node is lost. If unrelated nodes crash, the snapshot operation is not affected.

In Step 328, the DLM server grants the exclusive partition lock to the first node. By receiving the exclusive partition lock, the partition is quiesced and all dirty data besides at the first node has been flushed to the remote storage system.

In Step 330, the first node flushes any open streams and any dirty metadata. The first node determines what dirty data and dirty metadata (e.g., dirty data and metadata created after the end of first asynchronous flush in the first node) is present on the first node. This dirty data and dirty metadata are then flushed (e.g., saved to the remote storage system). Flushing the dirty data from the first node ensures the data of partition is consistent between the first node and the remote storage system.

In Step 332, the first node performs the snapshot. With the partition quiesced and all dirty data flushed, the snapshot can be performed. The snapshot captures a point in time in the partition in the remote storage system that reflects all the changes made by the nodes. The snapshot may be stored in the remote storage system.

In Step 334, the first node releases the exclusive partition lock. The snapshot being complete, the first node releases the exclusive partition lock. The shared partition lock may then be granted to other nodes to perform operations on the data of the partition.

In one or more embodiments, the DLM server can use the DLM application programming interfaces to embed additional information in the revoke requests and grant requests throughout the method of FIGS. 3.1-3.2. This additional information may include some hints on the data which can be utilized by the nodes to determine whether only data needs to be flushed or metadata needs to be flushed or both need to be flushed on a particular node. Additionally, a similar mechanism may be used to collect statistics from the identified nodes such as number of files synchronized before revoking the shared lock from a node. These statistics may be transmitted to the first node to have the information on total number of files synchronized to remote storage system before triggering a snapshot. Such meta-information can be communicated depending on the type of operation being performed.

After Step 334, the method may end.

Start of Example

Figure 4:
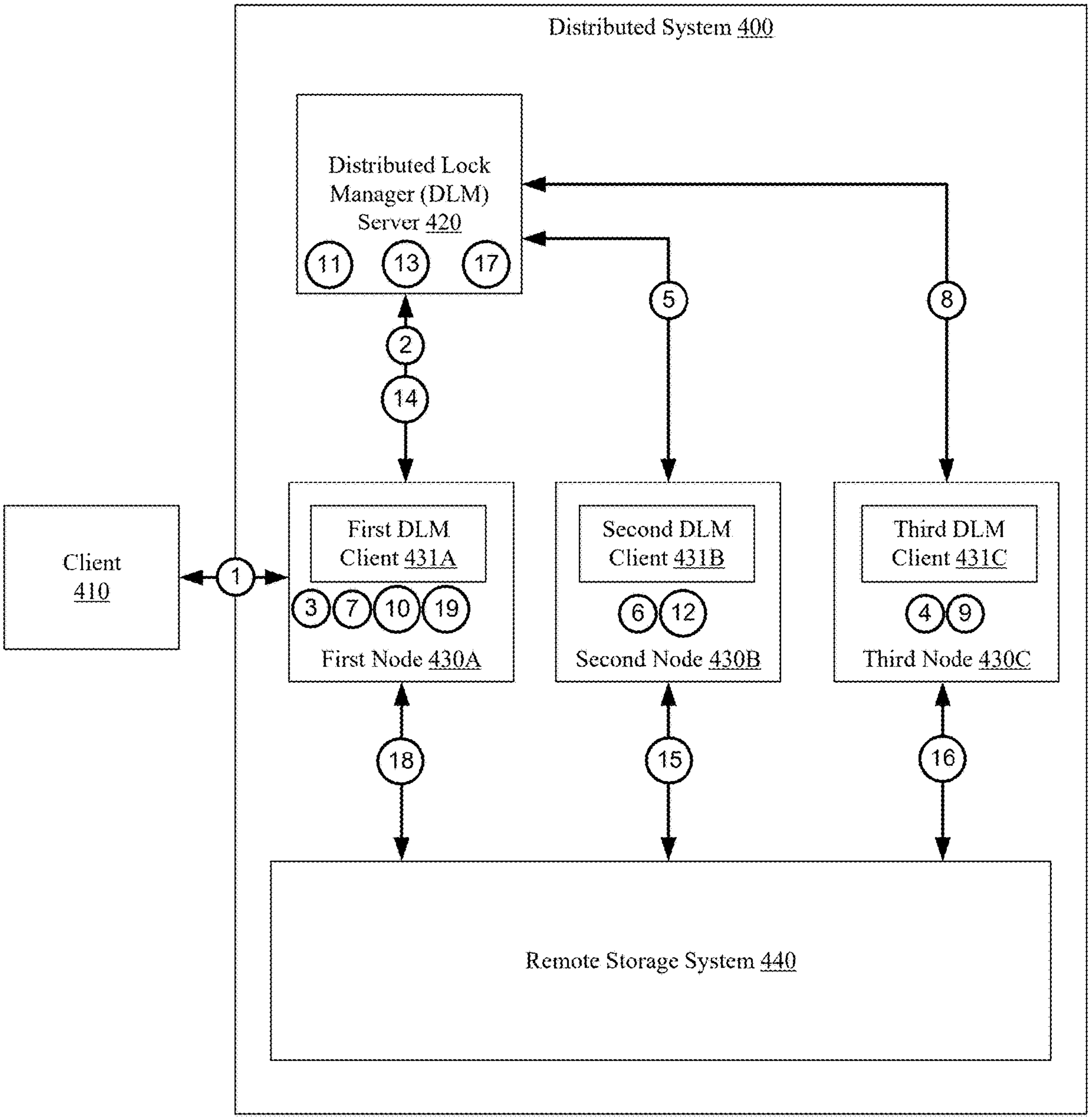
FIG. 4 show an example use case of a system for creating a snapshot in accordance with one or more embodiments disclosed herein.

The following section describes an example. The example, illustrated in FIG. 4, is not intended to limit the disclosure and is independent from any other examples discussed in this application. This example includes only the components necessary to describe the example and other components may be used with the example. Turning to the example, consider a scenario of creating a snapshot for a partition in a distributed system (400). The scenario reduces the duration of cluster freeze with asynchronous flushing to allow for parallel processing and flushing of dirty data. The distributed system includes a DLM server (420), a first node (430A), a second node (430B), a third node (430C), and a remote storage system (440). The distributed system (400) is connected to a client (410). The first node (430A) includes a first DLM client (431A) to communicate with the DLM server (420). The second node (430B) includes a second DLM client (431B) to communicate with the DLM server (420). The third node (430C) includes a third DLM client (431C) to communicate with the DLM server (420). The first node (430A), the second node (430B), and the third node (430C) are part of the partition and are connected to the remote storage system (440). A fourth node (not shown) and a fifth node (not shown) are not part of the partition but part of the distributed system and connected to both the DLM server (420) and the remote storage system (440).

Referring to FIG. 4, the first node (430A) receives a first request for a snapshot of the partition from the client (410)

[1]. Prior to receiving the first request, the first node (430A) and the second node (430B) have access and modification rights to the partition via a shared global flush lock and a shared partition lock. The third node (430C) begins without having the shared global flush lock and only having the shared partition lock. In response to the first request, the first node (430A) requests an exclusive global flush lock with the DLM server (420) to complete the snapshot [2]. After requesting the exclusive global flush lock, the first node (430A) performs an asynchronous flush on data present in the first node (430A) [3]. The asynchronous flush allows dirty data and dirty metadata present on the first node (430A) to be flushed to the remote storage system (440) prior to the exclusive global flush lock being granted to the first node (430A) reducing the cluster freeze duration of the partition. The asynchronous flush is started by a shared global flush end lock in the first node (430A). The shared global flush end lock is unlocked in the first node (430A) when the asynchronous flush is complete.

After requesting for the exclusive global flush lock, the third node (430C) attempts to modify data on the partition. In order to modify the data, the third node (430C) needs the shared global flush lock. The third node (430C) requests the shared global flush lock from the DLM server (420) [4]. The request from the third node (430C) is queued in the DLM server (420) behind the request from the first node (430A). The DLM server (420), in response to the request from the first node (430A), the DLM server (420) sends a global flush lock revoke request to the second node (430B) [5]. The revoke request includes code to prompt the second node (430B) to begin a second asynchronous flush on data present in the second node (430B) [6]. The second asynchronous flush allows dirty data and dirty metadata present on the second node (430B) to be flushed to the remote storage system (440) prior to the exclusive global flush lock being granted to the second node (430B) reducing the cluster freeze duration of the partition. The second asynchronous flush is started by the shared global flush end lock in the second node (430B). The shared global flush end lock is unlocked in the second node (430B) when the second asynchronous flush is complete.

The first node (430A) then receives the exclusive global flush lock from the DLM server (420) [7]. The first node (430A) immediately downgrades the exclusive global flush lock to a shared mode to allow data modifications to continue in the second node (430B) and the third node (430C) reducing the cluster freeze. With the exclusive global flush lock downgraded to the shared mode, the DLM server (420) grants the shared global flush lock to the third node (430C) [8]. The third node (430C) then makes modifications to the data on the partition such as writes to the data [9].

Once the first node (430A) ends the asynchronous flush (e.g., all dirty data is flushed to the remote storage system (440)), the first node (430A) requests an exclusive global flush end lock to ensure all asynchronous flushes are complete on the partition [10]. The DLM server (420) sends a global flush end revoke request to the second node (430B) because the DLM server (420) determines that this the only node with an active asynchronous flush [11]. The DLM server (420) determines the second asynchronous flush is complete because the second node has unlocked the shared global flush end lock [12]. With all asynchronous flushes complete, the DLM server (420) grants the exclusive global flush end lock to the first node (430A) [13].

Having the exclusive global flush end lock, the first node (430A) determines all asynchronous flushes are complete. The first node (430A) unlocks the exclusive global flush end lock and requests an exclusive partition lock from the DLM server (420) to perform the snapshot [14]. In response to the request, the DLM server (420) revokes the shared partition lock from the second node (430B) and the third node (430C). Prior to the revoking, the second node (430B) flushes any open streams (e.g., dirty data) and flushes any dirty metadata that was created after the second asynchronous flush [15]. The second node (430B) then has no dirty data and cannot create anymore dirty data prior to the snapshot. Prior to the revoking, the third node (430C) flushes any open streams (e.g., dirty data) and flushes any dirty metadata that was created after the third node (430C) was granted the shared global flush lock [16]. The third node (430C) then has no dirty data and cannot create anymore dirty data prior to the snapshot.

With the second node (430B) and the third node (430C) losing the shared partition lock, the DLM server (420) grants the first node (430A) the exclusive partition lock [17]. Prior to taking the snapshot, the first node (430A) any open streams and any dirty metadata that was created after the asynchronous flush [18]. The first node (430A) then has no dirty data and cannot create anymore dirty data prior to the snapshot. With all dirty data flushed on the partition and the exclusive partition lock, the partition is quiesce and ready for the snapshot. The first node (430A) performs the snapshot of the partition [19]. The snapshot is stored in the remote storage system (440). After the snapshot is created, the exclusive partition lock is revoked and shared partition locks are granted to return to modifying data.

End of Example

As discussed above, embodiments of the disclosure may be implemented using computing devices. FIG. 5 shows a diagram of a computing device in accordance with one or more embodiments disclosed herein. The computing device may include one or more computer processor(s) (502), non-persistent storage (504) (e.g., volatile memory, such as RAM, cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the disclosure, the processor(s) (502) may be an integrated circuit for processing instructions. For example, the computer processor(s) may be one or more cores or micro-cores of a processor. The computing device may also include one or more input devices (510), such as a touchscreen, keyboard, mouse, microphone, touchpad, electronic pen, or any other type of input device. Further, the communication interface (512) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the disclosure, the computing device may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the disclosure disclosed herein and the disclosure should not be limited only to solving the same/similar problems. The disclosure is broadly applicable to address a range of problems beyond those discussed herein.

Specific embodiments are described with reference to the accompanying figures. In the above description, numerous details are set forth as examples. It will be understood by those skilled in the art, that one or more embodiments of the present disclosure may be practiced without these specific details, and that numerous variations or modifications may be possible without departing from the scope. Certain details known to those of ordinary skill in the art are omitted to avoid obscuring the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the disclosure has been described above with respect to a limited number of embodiments, those skilled in the art, having the benefit of this disclosure, will appreciate that other embodiments can be devised which do not depart from the scope as disclosed herein. Accordingly, the scope of the disclosure should be limited only by the attached claims.

What is claimed is:

1. A method for creating a snapshot, comprising:
- receiving, at a first node, a first request for a snapshot of a partition of a distributed system;
- requesting, by the first node, an exclusive lock mode in the first node with a distributed lock manager (DLM) server;
- making a first determination, in response to the requesting an exclusive lock mode, identifying which nodes in a distributed system are on the partition and in a shared lock mode using the DLM server;
- sending, from the DLM server, a revoke request to identified nodes based on the first determination;
- flushing, in response to the revoke request, dirty data on the first node and the identified nodes to a remote storage system;
- after flushing the dirty data:
  - revoking the shared lock mode from the identified nodes;
  - granting the exclusive lock mode to the first node after revoking the shared lock mode from the identified nodes; and
  - creating, by the first node, the snapshot of the partition.

2. The method of claim 1, wherein the snapshot is stored on the remote storage system.

3. The method of claim 1, wherein the identified nodes comprise a second node and a third node on the partition.

4. The method of claim 3, wherein flushing dirty data comprises:
- flushing a first file on the first node to the remote storage system;
- flushing a second file on the second node to the remote storage system; and
- flushing a third file on the third node to the remote storage system.

5. The method of claim 3, wherein the first node, the second node, and the third node are in a shared lock mode prior to the first node requesting the exclusive lock mode.

6. The method of claim 1, wherein a fourth node and a fifth node are on the distributed system but are not associated with the partition.

7. The method of claim 1, wherein the revoke request to the identified nodes comprises DLM application programming interfaces to embed additional information in the revoke request, the additional information comprising hints on data on the partition which can be utilized by the identified nodes to identify the dirty data.

8. A non-transitory computer readable medium (CRM) comprising computer readable program code, which when executed by a computer processor enables the computer processor to perform a method for creating a snapshot, the method comprising:

receiving, at a first node, a first request for a snapshot of a partition of a distributed system;

requesting, by the first node, an exclusive lock mode in the first node with a distributed lock manager (DLM) server;

making a first determination, in response to the requesting an exclusive lock mode, identifying which nodes in a distributed system are on the partition and in a shared lock mode using the DLM server;

sending, from the DLM server, a revoke request to the identified nodes based on the first determination;

flushing, in response to the revoke request, dirty data on the identified nodes to a remote storage system;

after flushing the dirty data:

revoking the shared lock mode from the identified nodes;

granting the exclusive lock mode to the first node after revoking the shared lock mode from the identified nodes; and creating, by the first node, the snapshot of the partition.

9. The non-transitory CRM of claim 8, wherein the snapshot is stored on the remote storage system.

10. The non-transitory CRM of claim 8, wherein the identified nodes comprise the first node, a second node and a third node on the partition.

11. The non-transitory CRM of claim 10, wherein flushing dirty data comprises:

flushing a first file on the first node to the remote storage system;

flushing a second file on the second node to the remote storage system; and flushing a third file on the third node to the remote storage system.

12. The non-transitory CRM of claim 10, wherein the first node, the second node, and the third node are in a shared lock mode prior to the first node requesting the exclusive lock mode.

13. The non-transitory CRM of claim 8, wherein a fourth node and a fifth node are on the distributed system but are not associated with the partition.

14. The non-transitory CRM of claim 8, wherein the first request is received by a client device using the partition as a storage system.

15. A method for creating a snapshot, comprising:

receiving, at a first node, a first request for a snapshot of a partition on a distributed system, wherein the first node and a second node are in a shared global flush lock and a shared partition lock;

requesting, in response to the first request for a snapshot, by the first node, an exclusive global flush lock with a distributed lock manager (DLM) server;

after requesting the exclusive global flush lock, beginning an asynchronous flush in the first node, wherein the asynchronous flush is performed in a shared global flush end lock state;

sending, in response to requesting the exclusive global flush lock, a global flush lock revoke request to the second node from the DLM server;

beginning, in response to the global flush lock revoke request, a second asynchronous flush in the second node, wherein the second asynchronous flush is performed in the shared global flush end lock state;

after beginning the second asynchronous flush:

receiving, at the first node, the exclusive global flush lock from the DLM server, wherein the first node downgrades the exclusive global flush lock to shared mode to allow modifications to data on the partition;

making a first determination that that first node has completed the asynchronous flush based on the first node leaving the shared global flush end lock state;

requesting, based on the first determination, an exclusive global flush end lock for the first node;

sending, in response to requesting the exclusive global flush end lock, a second revoke request for a shared global flush end lock from the DLM server;

confirming, in response to the second revoke request, the second node has completed the second asynchronous flush based on the second node leaving the shared global flush end lock state;

receiving, based on the confirming, the exclusive global flush end lock at the first node;

requesting, by the first node, an exclusive partition lock;

in response to requesting the exclusive partition lock:

revoking, with the DLM server, the shared partition lock from the second node;

after revoking the shared partition lock from the second node, flushing any dirty metadata and dirty data in the second node;

after flushing the second node, granting, with the DLM server, an exclusive partition lock to the first node;

after granting the exclusive partition lock, flushing any dirty metadata and dirty data in the first node;

performing, after flushing the first node, the snapshot by the first node; and releasing, in response to the snapshot, the exclusive partition lock.

16. The method of claim 15, further comprising:

receiving, at the DLM server, a third request for the shared global flush lock from a third node in the shared partition lock after requesting the exclusive global flush lock with the first node and prior to receiving the exclusive global flush end lock at the first node;

granting, by the DLM server, the shared global flush lock in the third node after the first node downgrades the exclusive global flush lock and prior to and prior to receiving the exclusive global flush end lock at the first node;

performing data modifications with the third node after granting the shared global flush lock and prior to revoking the shared partition lock from the second node;

revoking the shared partition lock from the third node with the DLM server after performing data modifications and prior to granting the exclusive partition lock to the first node; and flushing, after revoking the shared partition lock from the third node, any dirty metadata and any dirty data from the third node prior to granting the exclusive partition lock to the first node.

17. The method of claim 15, wherein the snapshot is stored on a remote storage system.

18. The method of claim 15, wherein any dirty data and any dirty metadata from the first node and the second node is flushed to a remote storage system.

19. The method of claim 15, wherein the partition comprises the first node, the second node and a third node.

20. The method of claim 15, wherein a fourth node and a fifth node are on the distributed system but are not associated with the partition.

* * * * *